March 6, 1956 J. C. WILBORN 2,737,420
MEANS FOR BALANCING WHEELS
Filed Dec. 10, 1951 2 Sheets-Sheet 1
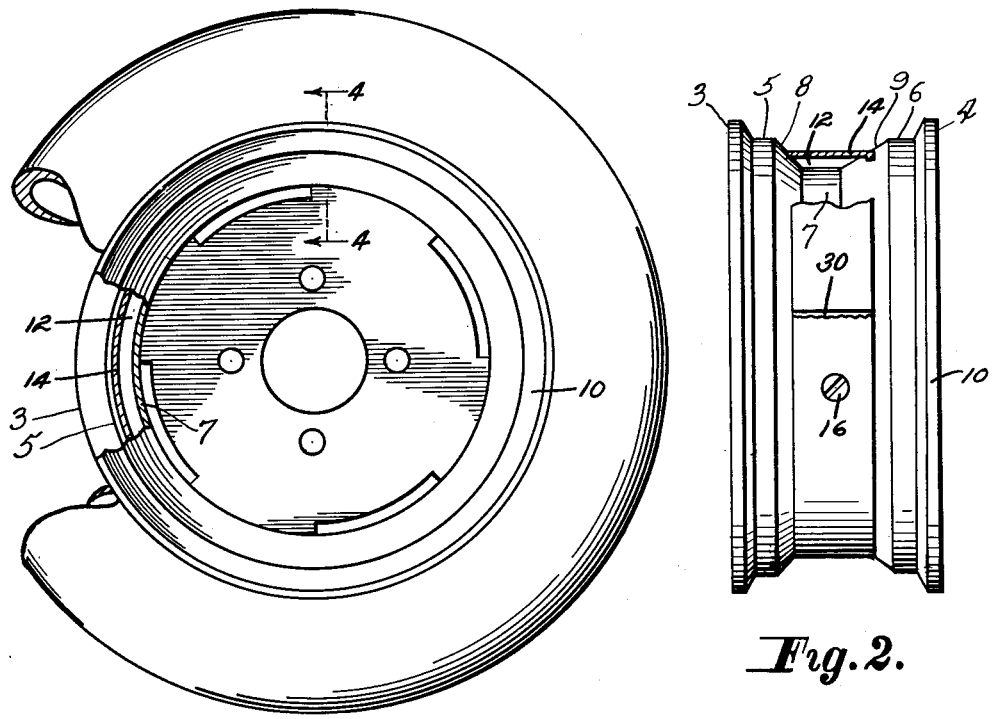
Fig. 1.
Fig. 2.
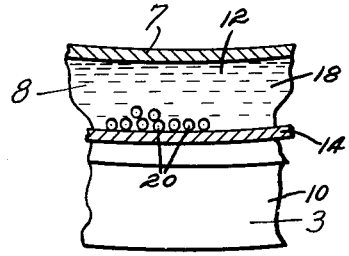
Fig. 3.
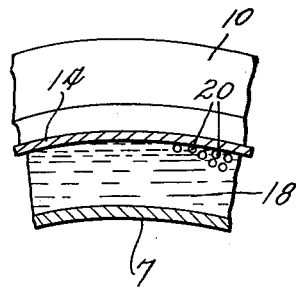
Fig. 5.
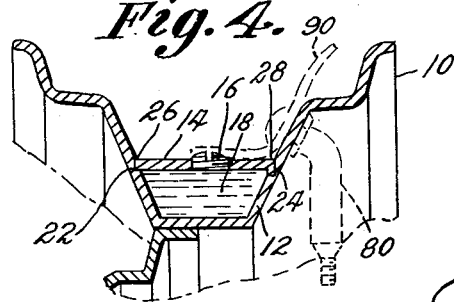
Fig. 4.
INVENTOR.
John C. Wilborn
BY Arthur H. Sturges
Attorney.

March 6, 1956  J. C. WILBORN  2,737,420
MEANS FOR BALANCING WHEELS
Filed Dec. 10, 1951  2 Sheets-Sheet 2

INVENTOR.
John C. Wilborn
BY Arthur H. Sturges
Attorney

United States Patent Office 2,737,420
Patented Mar. 6, 1956

2,737,420

MEANS FOR BALANCING WHEELS

John C. Wilborn, Shattuck, Okla.

Application December 10, 1951, Serial No. 260,851

4 Claims. (Cl. 301—5)

This invention relates to balancing devices for wheels of vehicles, particularly wheels having pneumatic tires such as motor vehicle wheels, and in particular a method for forming a continuous annular fluid channel in a rim or felly of a wheel whereby freely positioned solid globular members in said channel are thrown outwardly against the outer wall of the channel by centrifugal force as the wheel rotates and automatically balance the wheel.

The purpose of this invention is to provide means for continuously adjusting balancing members of a motor vehicle wheel to compensate for changes in conditions of parts of the wheel which cause the wheel to be off-balance.

Various devices have been provided for changing weights, and adjusting the positions of weights mounted on or attached to motor vehicle wheels to maintain the wheels in perfect balance, however such devices require the services of expert mechanics and the use of machines and other equipment, and as the balance of a motor vehicle wheel is continually changing the wheels of numerous vehicles are not balanced.

An unbalanced wheel not only causes uneven wear on a tire thereon, but also causes excessive wear in the bearings of the wheel.

With this thought in mind this invention contemplates an improved wheel particularly adapted for use on motor vehicles, in which balancing means is incorporated that is adjusted as the wheel rotates.

The object of this invention is, therefore, to provide means for constructing a motor vehicle wheel whereby continuously operating balancing instrumentalities maintain the wheel in balance.

Another object of the invention is to provide means for continuously adjusting the balance of a motor vehicle wheel that is adapted to be installed in wheels of vehicles now in use.

A further object of the invention is to provide balancing means for wheels of motor vehicles whereby the balance is continuously adjusted as the wheel is in operation, which remains in operation continuously throughout the life of the wheel.

A still further object of the invention is to provide a wheel having continuously operating balancing elements therein which is of a simple and economical construction.

With these and other objects and advantages in view the invention embodies a wheel having a rim with an annular recess in the outer surface, and a band positioned on the rim and providing a closure for said recess whereby an enclosed channel is provided in which a fluid with globular elements therein may be positioned.

Other features and advantages of the invention will appear from the following description taken in connection with drawings, wherein:

Figure 1 is a view showing a side elevation of a wheel with a pneumatic tire thereon and in which part of the tire and rim of the wheel are broken away to illustrate the position of a fluid channel in the rim.

Figure 2 is a view showing an end elevation of the rim of the wheel with part of a band forming a closure for a channel in the rim broken away to show the channel.

Figure 3 is a detail showing a longitudinal section through part of the rim with globular elements in a channel in the rim in the position of rest.

Figure 4 is a cross section through the rim taken on line 4—4 of Figure 1.

Figure 5 is a section similar to that shown in Figure 3 showing the globular elements held against the outer wall of the channel by centrifugal force.

Figure 6:
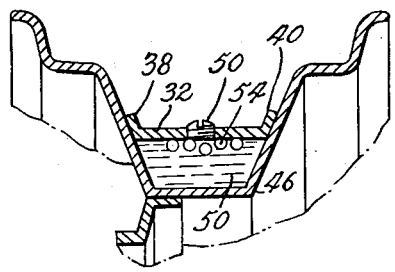
Figure 6 is a section similar to that shown in Figure 4 showing a modification wherein a band providing a closure for a channel in a wheel rim is formed with flanges on the edges to facilitate welding the band in position in the rim.

Referring now to the drawings wherein like reference characters denote corresponding parts the continuously adjusted balanced wheel of this invention includes a rim 10 with side flanges 3 and 4 extended from cylindrical shoulders 5 and 6, which provide seats for side walls of a tire, and from inner edges of the shoulders the rim extends inwardly providing an annular channel 12 with a bottom 7 and side walls 8 and 9. The channel, which is positioned in the intermediate part of the rim, is sealed with a band 14 the edges of which are secured, such as by welding to the side walls 8 and 9 providing a closure for the channel and the band is provided with a threaded plug 16 through which a fluid 18 and globular elements 20 may be placed in the channel. The outside diameter of the band being less than that of the cylindrical shoulders, a drop center is provided to facilitate removing and replacing tires on the rim.

One side of the rim 10 is provided with an annular groove 22 which is positioned to receive one edge of the band 14 and the other side is provided with an annular wedge shaped groove 24 that receives the opposite edge of the band, as shown in Figure 4. The edges of the band are secured to the rim preferably by welding as indicated at the points 26 and 28, and the ends of the band are welded together as shown at the point 30. It will be understood that the ends and also the edges of the band may be secured by other suitable means.

With the parts assembled as shown and described a conventional valve as shown in broken lines and indicated by the numeral 80 is extended from an inner tube 90, also indicated by broken lines, through an opening in a wall of the rim 10, as shown in Figure 4.

Figure 7:
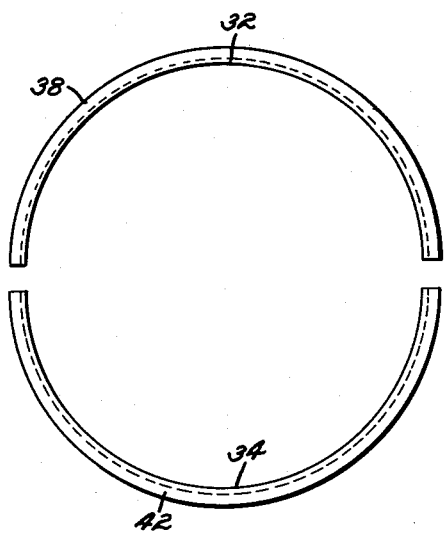
Figure 7 is a side elevational view of the band shown in Figure 6.
Figure 8:
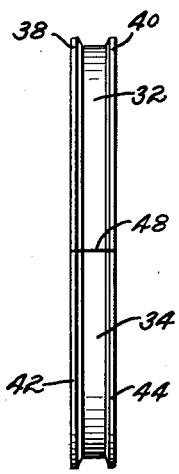
Figure 8 is a view looking toward the face of the band shown in Figure 6.

In the design illustrated in Figures 6, 7 and 8 a closure band is formed in two complementary sections 32 and 34, and the edges of the sections are provided with flanges to facilitate securing the sections to the rim 36, the section 32 having flanges 38 and 40, and the section 34 having flanges 42 and 44. The sections of the band are secured in position to provide a closure for a channel 46 in the rim preferably by welding and the ends of the sections are also welded together, as shown at the point 48.

The band formed with the sections 32 and 34 is also provided with a threaded plug, as indicated by the numeral 50, and a fluid 52, and also globular elements 54 are placed in the channel. The rim may be formed as shown in Figures 4 and 6, or may be of a suitable design wherein a band having outwardly extended tire holding flanges is provided with a continuous channel in the intermediate part.

The fluid used in the channels of the rims is a liquid preferably of the type wherein viscosity is not appreciably changed by changes in temperature or other atmospheric conditions and for this reason it is preferred to use ethylene-glycol, although it will be understood that other liquids may be used.

It is also preferred to use lead or steel shot as the solid globular elements, although these elements may also be of other suitable material.

In operation, the small globular elements drop to the lower side of the wheel when the wheel is stationary and when the wheel is rotating the globular elements are held by centrifugal force against the band which forms the closure for the channel, as shown in Figure 5, whereby the elements are disposed in such a position that will correct any inherent imbalances in the wheel in which the channel is positioned. It will be understood that the quantity of globular elements used in a wheel may be changed to compensate for different conditions, and as many of said elements may be used as may be desired.

As an example, a stock tire was purchased and mounted on a motor vehicle wheel, and by all conventional methods of balancing it was found that the least number of clipped on weights necessary to balance the wheel was four, the total weight of which was four ounces. The tire was marked at the valve stem opening and remounted in the same position on a wheel having the channel and floating weights of this invention. After being driven over ten thousand miles at excessive speeds the tire showed no cupping or beating as is associated with tires that are out of balance.

Each time the wheel is set in motion against a road surface the small round floating weights are thrown outwardly by centrifugal force against the inner surface of the band of the rim of the wheel and as the band is concentric with the center of the wheel the radius is equal at all points and the weights are limited. When the heavy portion of the tire strikes the road surface the force exerted will cause the round weights to float to the opposite side of the wheel in an attempt to soften the blow the next time around. It has been found that if a sufficient number of weights are present and the void within the wheel ample in size perfect static and dynamic balance could be had at all speeds. It is obvious that with the wheel spinning freely without the tire tread touching the road the round weights would dispose themselves evenly around the inner surface of the band, and it should also be obvious that as a heavy spot on a tire pounds or bounces against the road surface the distribution of the weights will not be even and the weights will move around the inner surface of the band and soften the pound or bounce the next time the same spot of the tire strikes the road surface.

It will be understood that a channel of this type may be formed in a wheel by other means, and the channel may be of any other suitable shape or size.

From the foregoing description it is thought to be obvious that the method and means for balancing wheels constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. In a motor vehicle wheel, the combination which comprises a rim having annular flanges at the sides which extend from outer edges of cylindrical shoulders and an inwardly disposed annular channel with a bottom and side walls in the intermediate part, the side walls of the channel being extended inwardly from inner edges of the cylindrical shoulders, a circular band positioned in said annular channel, the edges of said band being secured to and integral with said side walls, said band being concentric with the axis of the wheel and spaced inwardly from the outer surfaces of said cylindrical shoulders a sufficient distance to provide a drop center well to facilitate removing and replacing tires from and on the rim, said band having a threaded opening therein, a plug threaded in said opening in the band, and globular weights freely positioned in said channel and adapted to be retained by centrifugal force against the inner surface of said circular band upon rotation of the wheel.

2. In a motor vehicle wheel, the combination which comprises a rim having annular flanges at the sides and an inwardly disposed annular channel with a bottom and side walls in the intermediate part, a circular band positioned in said annular channel, the edges of said band being secured to and integral with said side walls, said band being concentric with the axis of the wheel and spaced inwardly from the outer surfaces of shoulders of said side walls of the channel toward said axis a sufficient distance to provide a drop center well to facilitate removing tires from and replacing tires upon the rim, said band having a threaded opening therein, a plug threaded in said opening in the band, ethylene-glycol in fluid state in said channel, and round lead weights freely positioned in said channel and adapted to be retained by centrifugal force against the inner surface of said circular band upon rotation of the wheel.

3. In a motor vehicle wheel, the combination which comprises a rim having annular flanges at the sides and an inwardly disposed annular channel with a bottom and side walls in the intermediate part, said side walls having grooves in opposed inner surfaces thereof, a circular band positioned in said annular channel, the edges of said band being positioned in said grooves of the side walls and integrally mounted therein, and said grooves being positioned whereby the band is concentric with the axis of the wheel, said band having a threaded opening therein, a plug threaded in the opening of the band, a fluid in said channel, and globular weights freely positioned in said channel and adapted to be retained by centrifugal force against the inner surface of the circular band upon rotation of the wheel.

4. In a motor vehicle wheel, the combination which comprises a rim having annular flanges extended from cylindrical shoulders at the sides and an inwardly disposed annular channel with a bottom and side walls in the intermediate part, a circular band having outwardly diverging flanges on the edges providing a closure for said channel and positioned with the flanges thereof resting against opposed inner surfaces of the side walls thereof, said band being concentric with the axis of the rim and spaced inwardly from the cylindrical shoulders of said side walls a sufficient distance to provide an annular channel for receiving the inner edges of a tire to permit the tire to be removed from and replaced on the rim, a filling plug positioned in said band, and globular weights freely positioned in said channel and adapted to be retained by centrifugal force against the inner surface of the circular band upon rotation of the wheel.

References Cited in the file of this patent

UNITED STATES PATENTS

| 1,314,005 | Louden | Aug. 26, 1919 |
| 2,029,132 | Skelton | Jan. 28, 1936 |

FOREIGN PATENTS

| 627,486 | France | June 11, 1927 |